United States Patent [19]
Imagawa et al.

[11] 3,806,228
[45] Apr. 23, 1974

[54] OPTICAL SPACIAL MODULATOR APPARATUS

[75] Inventors: Fumio Imagawa, Hachieji; Yasutsugu Takeda; Akio Kumada, both of Kokubunji, all of Japan

[73] Assignee: Hitachi, Ltd., Tokyo, Japan

[22] Filed: July 14, 1972

[21] Appl. No.: 271,827

[30] Foreign Application Priority Data
July 14, 1971  Japan.................................. 46-51729

[52] U.S. Cl................ 350/150, 340/173.2, 350/3.5, 350/160 R
[51] Int. Cl............................................... G02f 1/26
[58] Field of Search ........... 350/150, 3.5; 340/173.2

[56] References Cited
UNITED STATES PATENTS
| | | | |
|---|---|---|---|
| 3,684,351 | 8/1972 | Kumada | 350/150 |
| 3,453,561 | 7/1969 | Bonner et al. | 350/150 X |
| 3,503,673 | 3/1970 | Heilmeier et al. | 350/160 LC |
| 3,614,200 | 10/1971 | Taylor | 350/150 |

*Primary Examiner*—John K. Corbin
*Attorney, Agent, or Firm*—Craig and Antonelli

[57] ABSTRACT

An optical spacial modulator has a plurality of electrodes arranged in the form of a matrix on both surfaces of a ferroelectric crystal array. Pulses of equal magnitudes and opposite polarities are impressed on the electrodes, whereby the phase, polarized direction or amplitude of incident light is modulated in accordance with information to be recorded. A bias voltage is applied to either or both of the electrodes, so that the back-switching phenomenon may be prevented from occurring at each portion of the array.

18 Claims, 11 Drawing Figures

PATENTED APR 23 1974 3,806,228

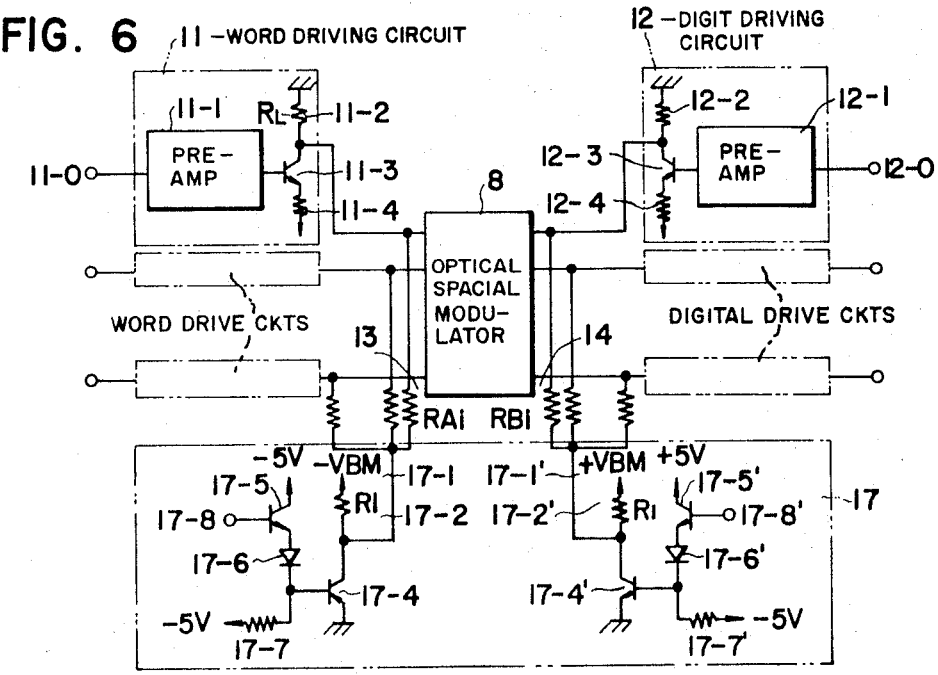
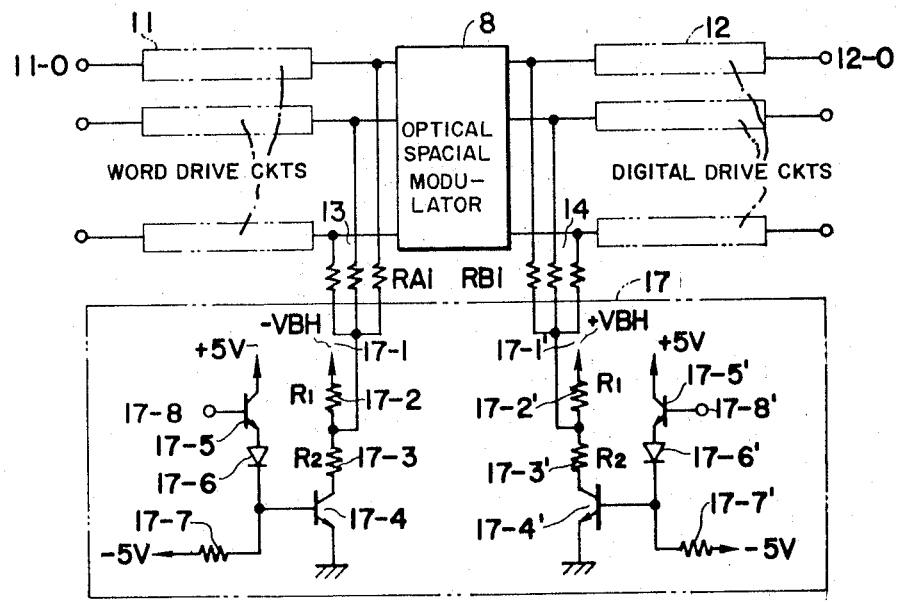

OPTICAL SPACIAL MODULATOR APPARATUS

BACKGROUND OF THE INVENTION

The present invention relates to an optical spacial modulator which is used for usual display apparatus employing light, temporary recording apparatus for patterns, a device for electrically composing memory information in a laser holography apparatus, and apparatus having the functions of exchange, retrival etc. of pattern information.

DESCRIPTION OF THE PRIOR ART

As will be hereinafter described, prior-art optical spacial modulators are disadvantageous in that they are incapable of accurately executing display, recording etc. of information patterns, due to the back-switching phenomenon inherent in a ferroelectric crystal array.

SUMMARY OF THE INVENTION

The principal object of the present invention is to provide an optical spacial modulator which is equipped with means to prevent the back-switching phenomenon.

In oder to accomplish the above-mentioned object, the present invention is characterized, in an optical spacial modulator, by being constructed so that a bias voltage or a potential difference corresponding thereto may be applied to both or either of the lateral electrodes and longitudinal electrodes disposed on both sides of a ferroelectric crystal array.

BRIEF DESCRIPTION OF THE DRAWINGS

FIG. 4 through 7 and 10 are circuit diagrams each showing an embodiment of the present invention.

DESCRIPTION OF THE PREFERRED EMBODIMENTS

Figure 1:
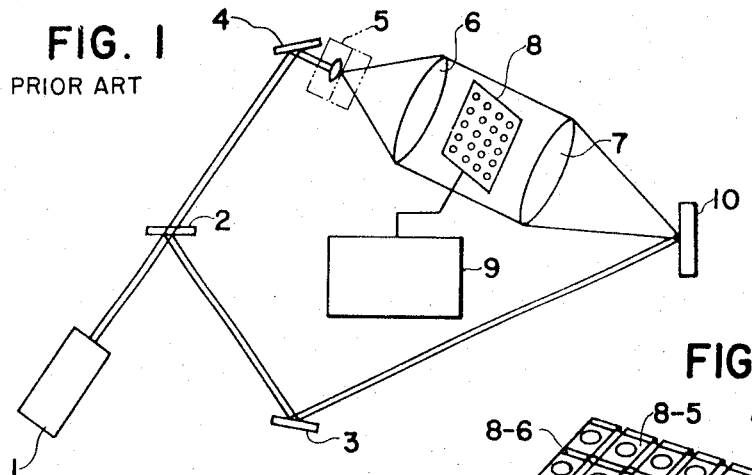
FIGS. 1 and 8 are schematic views each showing the construction of a conventional digital optical spacial modulator.

Optical spacial modulators can be broadly classified into analog optical spacial modulators and digital spacial modulators. The present invention is applicable to both the types. An analog optical spacial modulator can be fabricated by the cascade connection of digital optical spacial modulators. A digitial optical spacial modulator is, therefore, regarded as a typical type of optical spacial modulators, and will be described in detail hereunder. An example of the construction of a laser holography memory apparatus employing a digital optical spacial modulator is shown in FIG. 1. Referring to the figure, numeral 1 designates a laser light source, 2 a half-mirror, 3 and 4 reflectors, 5 a light beam expander, 6 a collimator lens, 7 a writing lens, 8 the digital optical spacial modulator, 9 a driving circuit for the digital optical spacial modulator, and 10 a photo-recording medium made of a photosensitive material. Herein, a light beam emerging from the laser light source 1 is split by the half-mirror 2 into two directions. One of the split beams falls as reference light on the photo-recording medium, while the other is magnified by the beam expander 5, is collimated by the collimator lens 6 and impinges on the optical spacial modulator 8. Light passing therethrough (object light) has its phase, amplitude or polarized direction modulated in accordance with information to be recorded in a way as hereinbelow stated, and is focused on the photo-recording medium by the writing lens 7. Thus, interference fringes between both sets of light rays are recorded on the photo-recording medium as a hologram.

Figure 2:
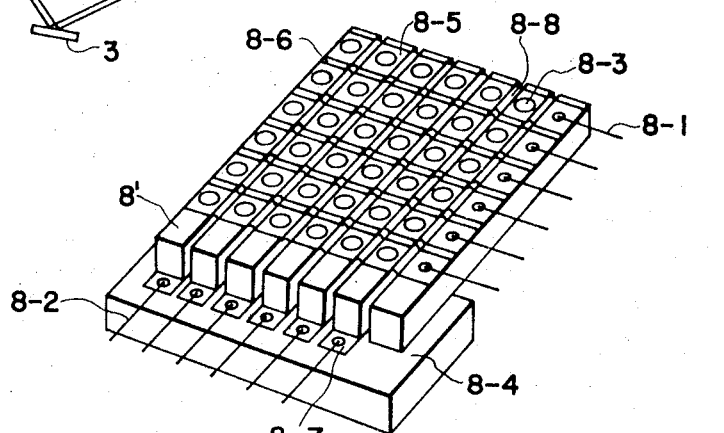
FIGS. 2 and 9 are schematic views each showing a conventional matrix array for the optical spacial modulator.
Figure 8:
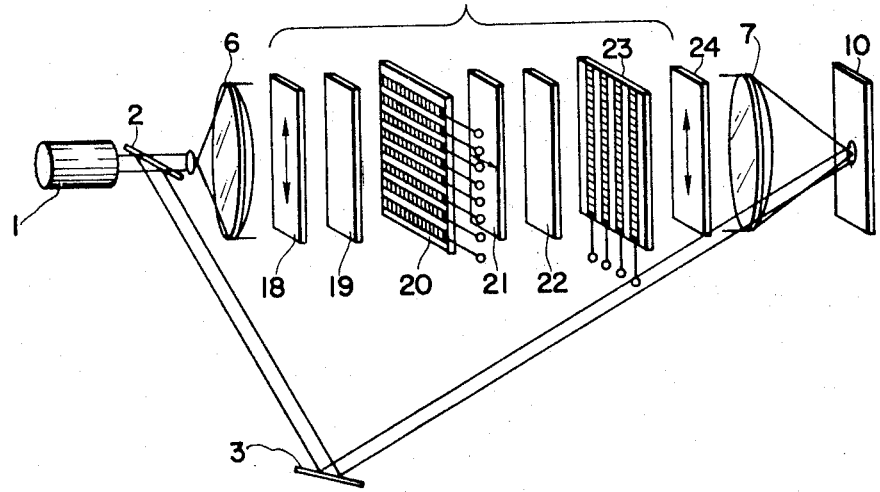

FIG. 2 shows an example of the digital optical spacial modulator which has a matrix array shaped structure. The matrix array for the optical spacial modulator is constructed such that stripe-shaped transparent electrodes (lateral electrodes) are provided on the front surface of a ferroelectric crystal plate, while an entire area transparent electrode is formed on the rear surface, that the crystal plate is cut in the form of slits so as to perpendicularly intersect with the electrodes on the front surface, and that the respective cut crystal plates 8' are connected by means of bridge-shaped electrodes provided on the front surface thereof. In FIG. 2, 8–1 and 8–2 indicate lead wires from the lateral electrodes 8–5 and longitudinal electrodes 8–7, respectively. 8–3 represents light-permeable apertures, 8–4 a crystal fixing plate, and 8–6 insulating layers. Shown at 8—8 are the bridge-like electrodes.

The ferroelectric crystal array operates as independent M-row and N-column cells by means of the orthogonally disposed electrodes which are provided on both the surfaces as shown. Since the characterizing feature of the present invention consists in the driving system therefor, the fundamental operation of a driving circuit will now be explained with reference to FIG. 3.

Figure 3:
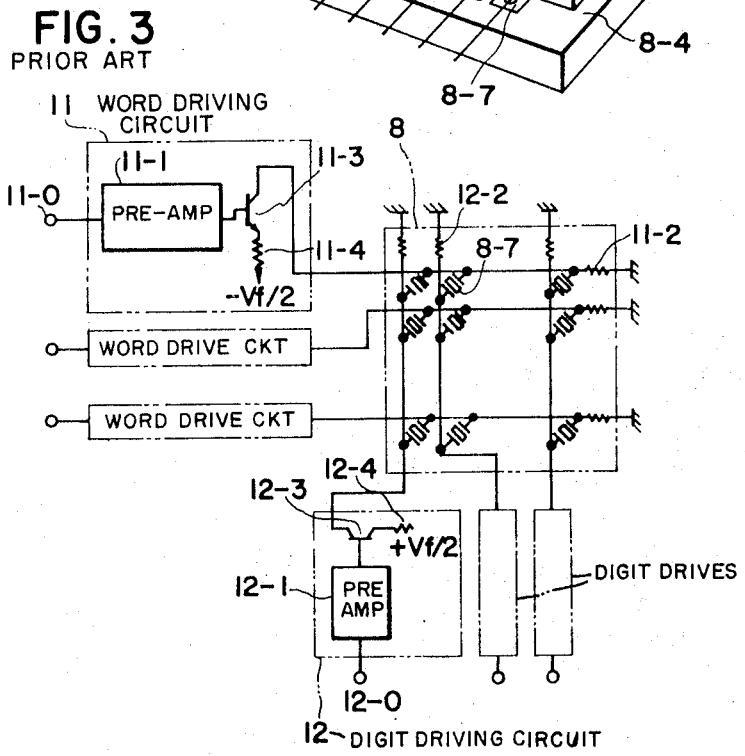
FIG. 3 is a diagram of a conventional driving circuit for the optical spacial modulator.
Figure 9:
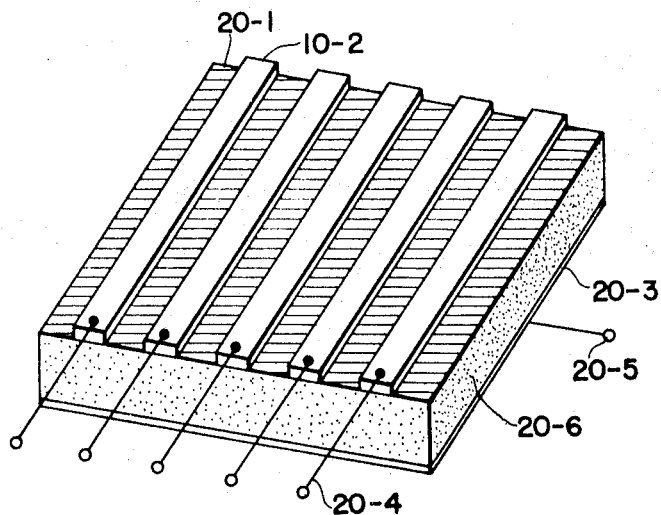

FIG. 3 illustrates the driving circuit for the optical spacial modulator. In the figure, reference numeral 11 indicates a word driving circuit, 12 a digit driving circuit, 11–0 a word input terminal, 12–0 a digit input terminal, 11–1 and 12–1 preamplifiers, 11–2 and 12–2 load resistances, 11–3 and 12–3 transistors, 11–4 and 12–4 emitter resistances, 8 a matrix array which includes electrodes arranged in the form of a matrix for a plurality of ferroelectric crystal elements as shown in FIG. 2, and 8–9 each matrix array element. The driving circuit arrangement of the digital optical spacial modulator drives the matrix array elements. For example, voltage pulses of $-V_f/2$ ( or $+V_f/2$ ) volts are successively applied to the respective lateral electrodes in conformity with information to be recorded. In synchronism therewith, voltage pulses of $+V_f/2$ ( or $-V_f/2$ ) volts are applied in parallel to the respective longitudinal electrodes. When light impinges on the element in which the potential difference at the intersection point between both the electrodes in the matrix array becomes $V_f$ volts, it is possible to cause a change in the polarization direction, amplitude or phase of the passing light when it passes therethrough. This state is termed the signal writing state. When the pulse application in the lateral and longitudinal directions has been completed, the elements (8–9) at the intersecting points of the respective electrodes in the matrix array 8 have been subjected to the change in response to the pulse application. Thus, the information is displayed and, in addition, stored temporarily. For the material of the ferroelectric crystal array of such digital optical spacial modulator, one having properties as listed below is desired:

a. A photo-switching function;
b. In a plane configuration, the photo-switching function can be produced at a part thereof;
c. A memory function is attendant upon the switching;
d. A switching voltage has a threshold value; and
e. The material is optically transparent and homogeneous.

The materials having these properties are gadolinium molybdate, PLZT, bismuth titanate, etc.

Among optical spacial modulators, in addition to that of the construction shown in FIGS. 2 and 3, there is the type as illustrated in FIGS. 8 and 9.

Referring to FIG. 8, numeral 8 indicates a section corresponding to the optical spacial modulator, and the remaining parts are the same as in the previous embodiment. The optical spacial modulator 8 comprises a polarizer 18, a first quarter-wavelength plate 19, a first ferroelectric crystal array 20 provided with transparent electrodes in the form of stripes in the lateral direction and having a thickness equivalent to that of a quarter-wavelength plate, an analyzer 21, a second quarter-wavelength plate 22, a second ferroelectric crystal array 23 provided with transparent electrodes in the form of stripes in the longitudinal direction and having a thickness equivalent to that of a quarter-wavelength plate, and an analyzer 24. In operation, parallel fluxes of light are converted into linear polarized light by the polarizer 18. The linearly polarized light is transmitted through the quarter-wavelength plate 19, to be converted into right-hand (or left-handed) plane polarized light. The first ferroelectric crystal array 20 is provided with the M stripe electrodes in the lateral direction, and pulse signals are applied to the electrodes in a time sequence. At this time, the polarization of the ferroelectric crystal elements is inverted by the applied pulse signals, and they operate to arrange the right-hand (or left-handed) plane polarized light rays in the lateral direction, namely, in the light passing direction of the analyzer 21 in FIG. 8. In contrast to this, the ferroelectric crystal elements at the electrode parts at which the pulse signals are not applied operate to arrange the right-handed (or left-handed) plane polarized light rays in the longitudinal direction, namely, in the light intercepting direction of the analyzer 21 in FIG. 8. Thus, light directed from the analyzer 21 to the second quarter-wavelength plate 22 is changed over at every row by the pulse signal.

The operation of writing information into the light beam of one row will now be explained. When the stripe-shaped beam at the first row passes through the second quarter-wavelength plate 22, the light is again converted into right-handed (or left-handed) plane polarized light. The second ferroelectric crystal array 23 is provided with the stripe-shaped transparent electrodes in the column or longitudinal direction. Pulse signals to invert the polarized states are applied to the electrodes in parallel to the lateral direction only at places where information "1" are written. Light rays passing through the ferroelectric crystal elements at the places to which the pulse signals have been applied have their direction of polarization changed from the right-handed (or left-handed) plane polarization to the longitudinal direction, namely, in the direction permitting passage through the analyzer 24, in FIG. 8. Thus, light information corresponding to one row is written. The light beam passing through the analyzer 24 is converged by the information writing lens 7, and reaches the photo-recording medium 10 together with the reference light from the mirror 3. In this way, hologram recording of the first row is carried out. Thereafter, similar operations are repeated from the second row to the M-th row, to form a single hologram.

The first and second ferroelectric crystal arrays in the foregoing optical spacial modulator are constructed as in FIG. 9 by way of example.

Referring to FIG. 9, 20–1 indicates an insulating layer, 20–2 a stripe-shaped transparent electrode (lateral electrode or longitudinal electrode) disposed on one surface, 20–3 a transparent electrode disposed on the entire area of the other surface, 20–4 a lead wire from the transparent electrode 20–2, 20–5 a lead wire from the transparent electrode 20–3, and 20–6 a ferroelectric material plate. When a pulse signal is applied across one transparent electrode and the other transparent electrode, the polarized state of that part of the plate 20–6 which is held between both the electrodes is switched and, as stated above, the polarized direction of light incident on that part is changed.

As described above, when the pulse signal is applied to the electrodes provided in the ferroelectric crystal array in the optical spacial modulator, information corresponding to a "1" is written, while when not applied, information corresponding to a "0" is written.

Let it be assumed that information representative of a "1" is written in the foregoing ferroelectric crystal array by the pulse. Then, a phenomenon appears in which, when the writing pulse becomes 0, the written state is restored to the original state. The phenomenon is herein called the back-switching. When the back-switching phenomenon occurs, the matrix array of the digitial optical spacial modulator fails to store a written pattern. This has hitherto hindered realization of an optical spacial modulator apparatus which can perfectly conduct display, recording, composition or the like of information.

Heretofore, no method for eliminating the back-switching phenomenon has been found; the present invention suggests means of solving the problem. Back-switching, as previously discussed, is a peculiar property occurring in a series of ferroelectric materials, and is considered to be attributable to the stress associated with the internal strain of a crystal. Basically, the present invention nullifies the internal stress with a voltage. The fact that an internal stress can be considered in an equivalent substitution for a voltage (as given in the following equation (1)) is itself known as the piezoelectric effect and, hence an explanation is omitted herein.

$$V_T = \gamma E \tag{1}$$

where $V_T$ = Voltage calculated from internal strain,
$\gamma$ = A proportionality constant, and
$E$ = Internal stress.

Therefore, in order to prevent the back-switching, it is one effective procedure to apply to the element a bias voltage $V_B$ to the matrix array as follows:

$$V_B \geqq V_T \tag{2}$$

Practical arrangements of the present invention will now be described in conjunction with some preferred embodiments. FIGS. 4 to 7 illustrate back-switching preventing or blocking circuits which are suitable to the optical spacial modulator as shown in FIGS. 2 and 3.

Figure 4:
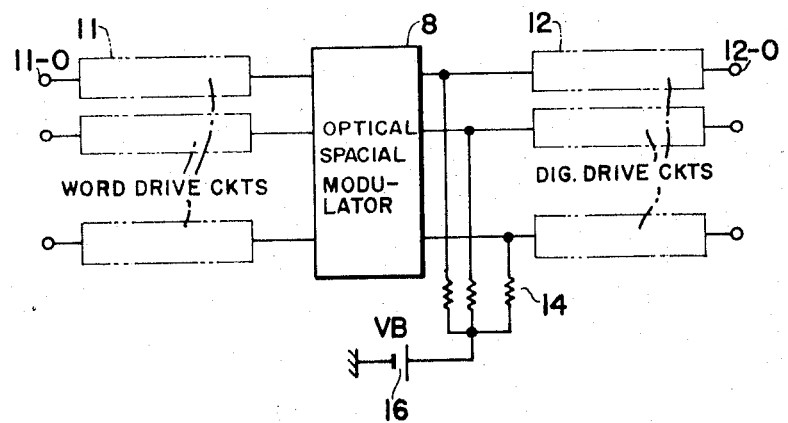

Referring first to FIG. 4, numeral 8 designates a matrix array, 11 a word driving circuit, 11-0 a word input terminal, 12 a digit driving circuit, 12-0 a digit input terminal, 14 a bias resistance, and 16 a bias voltage source. The embodiment has its characterizing feature in that the foregoing voltage is applied as a bias onto the digit side or the word side. In the method, however, a disturbing voltage in the following equation is also applied to the elements which are not in the writing state.

$$V_d = V_f/2 + V_B \quad (3)$$

where:
$V_d$ = Disturbing voltage,
$V_f$ = Writing voltage, and
$V_B$ = Bias voltage.

Accordingly, if the disturbing voltage is high, to some extent, there is the problem that the distrubance may be written in elements of low threshold voltages. It is, therefore, effective to lower the disturbing voltage. Taking this into consideration is a circuit in FIG. 5.

Figure 5:
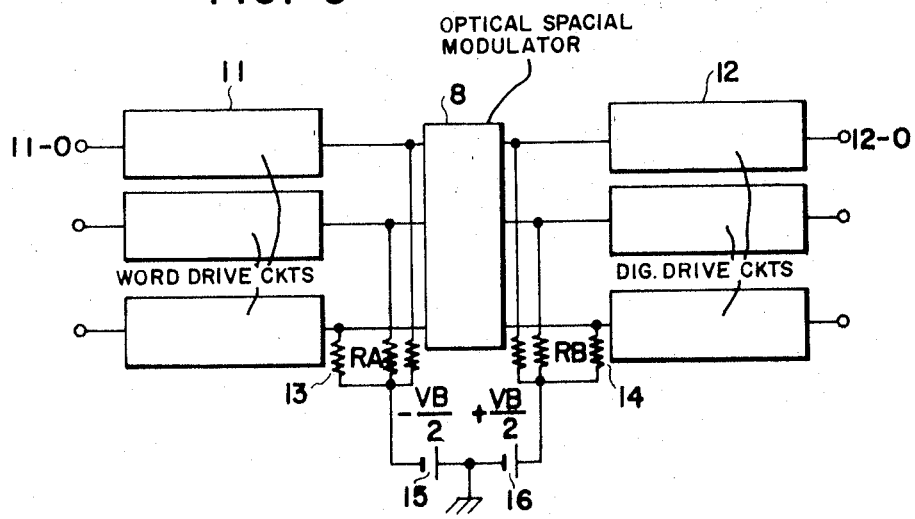

Referring to FIG. 5, numerals 13 and 14 indicate bias resistances, while 15 and 16 are bias voltage sources. In the circuit, in order to lower the disturbing voltage, the bias voltage is dividedly applied by every $V_B/2$ from the word and digit sides. As a result, the disturbing voltage becomes:

$$V_d = V_f + V_B/2 \quad (4)$$

With a matrix array being intense in the back-switching phenomenon, however, a considerably high bias voltage should be applied thereto in order to prevent this phenomenon. The arrangement in FIG. 5, is therefore, still substantially in effective for elements of low threshold values. In such a case, further measures are needed as discussed below.

Referring to FIG. 6, numeral 11 represents a word driving circuit, 11-0 a word input terminal, 11-1 a preamplifier, 11-2 a load resistance, 11-3 a transistor, 11-4 an emitter resistance, 12 a digit driving circuit, and 12-0 a digit input terminal. Parts 12-1 to 12-4 are the same as those 11-1 to 11-4, respectively. Reference numerals 13 and 14 indicate bias resistances, 17 a bias circuit, 17-1 a bias voltage, 17-2 a load resistance, 17-4 and 17-5 transistors, 17-6 a diode, and 17-7 an emitter resistance. 17-1' to 17-7' correspond to 17-1 to 17-7 respectively. Reference numerals 17-8 and 17-8' designate bias input terminals. The embodiment is characterized in that, when a writing pulse is impressed, the bias voltage is brought into the grounded state, while when the writing pulse becomes 0, a bias voltage $V_{BM}$ is applied. The circuit operation will be concretely explained below.

A bias signal, similar to a writing clock pulse, is applied to the terminals 17-8. When the signal is at a certain level ( here it is assumed that the writing pulse is in the "off" state ), the base voltage of the transistor 17-4 is level-limited by a grounded emitter circuit at the preceding stage. As a result, the base-emitter circuit of the transistor 17-4 is reverse-biased to cut off the transistor. The matrix element is, therefore, applied with the following bias voltage:

$$V_{Wi} = (-V_{BM}) \times (R_L/R_L + R_{Ai} + R_1) \quad (5)$$

where:
$V_{Wj}$ = Voltage applied to the i-th word electrode (lateral electrode), and
$R_{Ai}$ = The i-th bias resistance.
In the above equation, $$R_1 << R_L + R_{Ai} \quad (6)$$

From this relation, $$V_{Wi} = V_{BM}/2 \quad (7)$$

where:
$V_{BM}$ = Bias voltage,
$V_{Wi}$ = Applied voltage of an element.

On the other hand, when the input is 0 volts (now, it is assumed that the writing pulse is in the "on" state), the base of the transistor 17-4 becomes negative since the transistor 17-5 is in the grounded emitter type. The base-emitter circuit of the transistor 17-4 is, accordingly, forward-biased to bring the transistor into the "on" state and the element into the grounded state. Similarly, in the digit bias circuit, when the writing pulse is in the "off" state, $$V_{Di} = + (V_{BM}/2) \quad (8)$$

where:
$V_{Di}$ = Voltage applied to the i-th digit electrode.
When the writing pulse is "on," the element is brought into the grounded state, and the bias voltage becomes effectively equal to zero. Consequently, the disturbing voltage becomes $V_f/2$, which is a minimum. Since, however, the bias signal is synchronized with the writing clock pulse, the bias voltage is grounded by certain writing pulses even when the signal is "off." It can, therefore, be seen that the element gives rise to back-switching. In consideration of this point, it is preferable to employ a bias circuit in which the embodiments in FIGS. 5 and 6 are combined. Such an embodiment is shown in FIG. 7.

Referring to the figure, 17-3 and 17-3' indicate load resistances. A bias signal synchronized with a writing pulse is fed from the terminal 17-8. When the signal is at a certain level ( here, it is assumed that the writing pulse is in the "off" state ), the element is applied with the following voltage:

$$V_{Wi} = (-V_{BM}) \times (R_L/R_1 + R_{Ai} + R_L) \quad (9)$$

where:

$V_{wi}$ = Voltage applied to the i-th word electrode, and $V_{BM}$ = Bias voltage.

From the relation:

$$R_1 << R_{Ai} \div R_L \quad (10)$$

the above equation becomes:

$$V_{wi} = -(V_{BM}/2) \quad (11)$$

When the bias signal is applied to the terminal 17–8, the transistor 17–4 is turned on, so that:

$$V_{wi} = (-V_{BM}) \times (R_2/R_1 + R_2) \times (R_L/R_L + R_{Ai})$$
$$\div -(V_{BM}/2) \times (R_2/R_1 + R_2) \quad (12)$$

Similar relations apply to the digit bias circuit. This time, the disturbing voltage becomes:

$$V_d = \frac{V_f + V_{BM} \times \frac{R_2}{R_1 + R_2}}{2} \quad (13)$$

which is considerably low, and is effective to prevent back-switching.

Examples of concrete numerical values in this case are listed below. Gadolinium molybdate ($Gd_2MoO_4$) is used for the ferroelectric crystal, and the thickness is approximately 775$\mu$ (microns). The switching voltage $V_f$ is about 400 V, the bias voltage $V_{BM}$ is about 150V, the resistance $R_1$ is about 12$k\Omega$, and $R_2$ is about 2$k\Omega$. $V_{wi}$ is approximately 30 V, while the disturbing voltage $V_d$ is about 230V.

Figure 10:
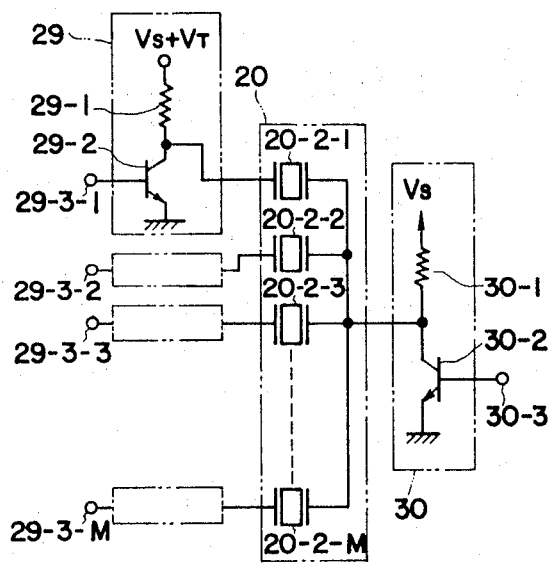

A back-switching blocking circuit suitable for the optical spacial modulator shown in FIGS. 8 and 9, is illustrated in FIG. 10. The circuit is characterized in that a pulse voltage impressed across the electrodes on both the surfaces of the first and second ferroelectric crystal arrays has a potential difference corresponding to the foregoing bias voltage.

Referring to FIG. 10, numeral 20 indicates an optical spacial modulator which includes the first and second ferroelectric crystal arrays, etc. Shown at 20–2-1, 20–2-2, . . . 20–2-M are ferroelectric crystal element protions between electrodes in the arrays, respectively. Reference numeral 29 designates a writing driving circuit, which has a long resistance 29–1 and a transistor 29–2. Shown at 29–3-1, 29–3-2, . . . 29–3-M are writing input signal terminals, respectively. Reference numeral 30 represents a switching control circuit, which has a load resistance 30–1 and a transistor 30–2. A switching signal terminal is shown at 30–3.

Figure 11:
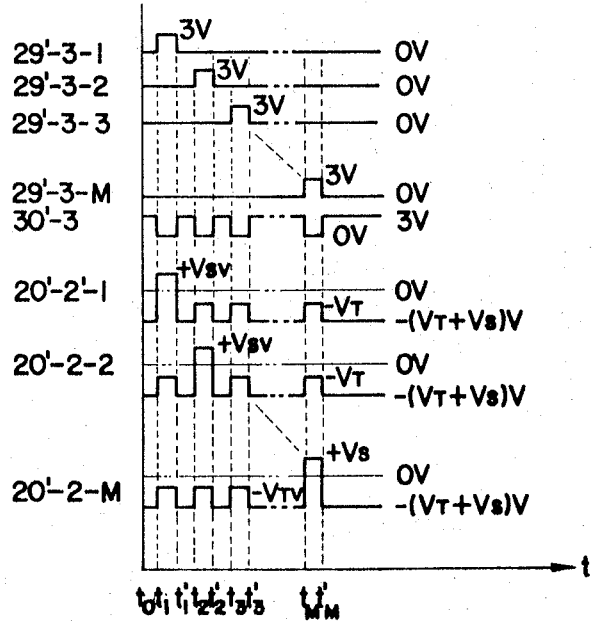
FIG. 11 is a pulse wave-form diagram for the circuit in FIG. 10.

FIG. 11 illustrates input signals to the driving and control circuits, and the distribution of potential differences effectively applied to the ferroelectric crystal arrays. Referring to the figure, 29'–3-1, 29'–3-2 . . . 29'–3-M designate writing signals, 30'–3 a switching signal, and 20'–2-1, 20'–2—2, . . . 20'–2-M voltages effectively applied to the ferroelectric crystal arrays.

This embodiment will now be concretely explained. A first case may be considered where the writing signal 29'–3-1 in FIG. 11 is applied to the writing input terminal 29–3-1 in FIG. 10. When the input signal is $V_1$ (for example, 0 volts), the base and emitter of the transistor 29-2 are of the same voltage. The transistor is, therefore, cut off, that is, the writing side of the ferroelectric crystal element 20-2-1 becomes $+(V_S + V_T)$ volts. When the input signal is $V_2$ (for example, 3 volts), the base-emitter circuit of the transistor 29-2 is forward-biased. The transistor is, therefore, turned on, that is, the writing side of the ferroelectric crystal element 20–2-1 becomes 0 volts. Similarly, when the writing input signals 29'–3-2, 29'–3-3, . . . 29'–3-M in FIG. 11 are applied to the writing signal input terminals 29–3-2, 29–3-3, . . . 29–3-M in FIG. 10, the writing side of the ferroelectric crystal elements 20–2-2, 20–2-3, . . . 20–2-M becomes $+(V_S + V_T)$ volts for the input signal of 0 volts, and becomes 0 volts for the input signal of 3 volts. At that time, the switching signal 30'–3 in FIG. 11 is applied to the switching input terminal 30-3 in FIG. 10. Then, when the switching signal is 0 volts, the base and emitter of the transistor 30-2 have the same voltage. The transistor is, therefore, cut off, that is, the switching side of the ferroelectric crystal element portions 20–2-1, 20–2—2, . . . 20–2-M becomes $+V_{ST}$. On the other hand, when the switching signal is 3 volts, the base-emitter circuit of the transistor 30-2 is forward-biased. The transistor is, therefore, turned on, that is, the switching side of the ferroelectric crystal elements 20–2-1, 20–2—2, . . . 20–2-M becomes 0 volts. It is the voltages 20'–2-1, 20'–2—2, . . . 20'–2-M in FIG. 11 that depict the foregoing in potential differences so as to facilitate understanding, and they are respectively applied to the ferroelectric crystal elements 20–2-1, 20–2—2, . . . 20–2-M in FIG. 10. In the illustration, $V_S$ is a voltage required for switching, while $V_T$ is a voltage for preventing such phenomena as back-switching.

The foregoing distribution of potential differences will be simply explained. In the case of 20'–2-1 in FIG. 11, at $t_0 \leq t \leq t_1$, the element portion 20–2-1 is applied with the "off" voltage $-(V_T + V_S)$ volts, and it is, accordingly, in the "off" state. At $t_1 \leq t \leq t'_1$, the element portion is applied with the writing voltage $+V_S$ volts, so that it is in the "on" state. At $t'_1 \leq t \leq t_2$, since the element portion is applied with the "off" voltage $-(V_T + V_S)$ volts, it is in the "off" state. At $t_2 \leq t \leq t'_2$, no writing signal is applied to the element portion and, hence, $-V_T$ volts are applied so as to prevent the element portion from turning on. At $t \geq t'_2$, the above operations are repeated in response to the input signals. The same applies to the voltages 20'–2-2, 20'–2-3, . . . 20'–2-M. The circuit arrangement of the present invention is effective to prevent the elements from becoming unstable due to internal stresses. As for the back-switching, if the relation between the magnitudes of the writing voltage and the switching voltage is made opposite, the switching state is held when the writing signal pulse becomes "off." The ferroelectric crystal element is, accordingly, applied with $+V_T$ volts, so that back-switching does not occur. Therefore, $V_T$ can be a positive or negative voltage in the circuit arrangement of the present invention.

We claim:

1. An optical spacial modulator apparatus comprising:

a ferroelectric crystal array having a plurality of lateral electrodes disposed on the front surface thereof and a plurality of longitudinal electrodes disposed on the rear surface thereof, said lateral and longitudinal electrodes being arranged perpendicularly with respect to each other;

pulse producing means for producing first pulses and second pulses having respective polarities opposite each other in accordance with information to be recorded;

first means for applying said first pulses to said respective lateral electrodes;

second means for applying said second pulses to said respective longitudinal electrodes corresponding to the respective lateral electrodes, said array being adapted to modulate the light incident thereon at every portion of said array between both said electrodes according to the direction of electric polarization caused by applying said first and second pulses thereto;

a bias voltage source means for producing a bias voltage, which voltage prevents the occurrence of back-switching phenomena of the electric polarization in said pulses; and thrid means for applying the bias voltage from said bias voltage source means to at least said respective lateral electrodes.

2. An optical spacial modulator apparatus according to claim 1, wherein the bias voltage source means is so constructed as to produce a first bias voltage and a second bias voltage having an amplitude equal to that of the first bias voltage and polarity opposite thereto which are applied to the lateral and longitudinal electrodes, respectively.

3. An optical spacial modulator apparatus according to claim 2, which further comprises fourth means for grounding said first and second bias voltages when the first and second pulses are applied to the lateral and longitudinal electrodes, respectively.

4. An optical spacial modulator apparatus according to claim 2, which comprises fifth means for reducing said first and second bias voltages to a prescribed value more than zero volts.

5. An optical spacial modulator apparatus comprising:

a first ferroelectric crystal array having a plurality of lateral electrodes disposed on the front surface thereof and a first plane electrode disposed on the entire rear surface thereof;

a second ferroelectric crystal array having a plurality of longitudinal electrodes disposed on the front surface thereof and a second plane electrode disposed on the entire rear surface thereof, said lateral and longitudinal electrodes being arranged perpendicularly with respect with each other;

pulse producing means for producing first pulses and second pulses having a polarity opposite to that of said first pulses in accordance with information to be recorded;

first means for applying said first pulses to the respective lateral electrodes and the longitudinal electrodes corresponding thereto;

second means for applying the second pulses to the first and second plane electrodes;

said array being adapted to modulate light incident thereon at every portion of said first and second arrays between said electrodes according to the direction of electric polarization caused by applying said first and second pulses thereto; and third means for providing a voltage representative of the difference between both amplitudes of said first and second pulses, which prevents the occurrence of back-switching phenomena in said each portion of said arrays.

6. An electro-optical spacial modulator apparatus comprising:

a ferroelectric crystal element having at least one first electrode disposed on a first surface of said crystal element and at least one second electrode disposed on a second surface of said crystal element opposite said first surface thereof;

first means for applying at least one first pulse to said at least one first electrode;

second means for applying at least one second pulse to said at least one second electrode;

said ferroelectric crystal element being adapted to modulate the light incident thereon at the portion of said element between both said electrodes according to the direction of electric polarization caused by applying said first pulse and second pulses thereto; and third means, coupled to at least said at least one first and second electrodes, for preventing back-switching phenomena in the crystal element by applying a bias voltage to at least said at least one first and second electrodes.

7. An apparatus according to claim 6, wherein said third means includes means for applying first and second voltages having equal amplitudes and opposite polarities to said first and second electrodes respectively.

8. An apparatus according to claim 7, wherein said third means further includes means for reducing the amplitudes of said first and second voltages applied to said electrodes.

9. An apparatus according to claim 8, wherein said amplitude reducing means includes means for reducing the amplitudes to substantially zero.

10. An apparatus according to claim 8, wherein said amplitude reducing means includes means for reducing the amplitude to a value different than zero.

11. An apparatus according to claim 6, wherein said first and second voltage pulses have a potential sufficient to cause switching of the state of the portion of said crystal element between said first and second electrodes, while said bias voltage has a potential difference, with respect to the amplitudes of said pulse, sufficient to prevent back-switching in said element.

12. An apparatus according to claim 11, wherein the amplitude and polarity of said bias voltage is different from the amplitude and polarity of one of said first and second voltage pulses.

13. An apparatus according to claim 6, wherein said first means comprises a first switch means, to which a first switching signal is supplied, for coupling said bias voltage and said first pulse to said at least one first electrode.

14. An apparatus according to claim 6, wherein said second means comprises a second switch means, to which a second switching signal is supplied, for coupling said second voltage pulse to said at least one second electrode.

15. An apparatus according to claim 6, wherein said ferroelectric crystal element comprises a ferroelectric crystal array having a plurality of first electrodes disposed on a first surface of said array, and wherein said second electrode comprises a planar electrode disposed on the second surface of said crystal array.

16. An apparatus according to claim 15, wherein said modulator apparatus further comprises an additional ferroelectric crystal array having an additional plurality of first electrodes disposed on a first surface thereof, an additional second planar electrode disposed on the second surface of said additional ferroelectric crystal array, and wherein said additional plurality of first electrodes disposed on the first surface of said additional crystal array are disposed orthogonally with respect to the direction of the first electrodes on said first mentioned crystal array.

17. An apparatus according to claim 16, wherein said apparatus further includes a first polarizer and a first quarter waveplate disposed between the respective ferroelectric crystal arrays, a second quarter waveplate and a second polarizer disposed on one side of one of said arrays opposite the side facing the other array, a third polarizer disposed in the side of the other of said arrays opposite the side thereof facing said one of said arrays, and means for directing a collimated coherent beam of light through said polarizers, quarter waveplates and arrays.

18. An apparatus according to claim 17, further including means for directing a reference beam of light and said collimated beam of light onto an optical recording medium.

* * * * *